(No Model.)
J. HILL.
COMBINED TRUCK AND STEP LADDER.
No. 345,973. Patented July 20, 1886.
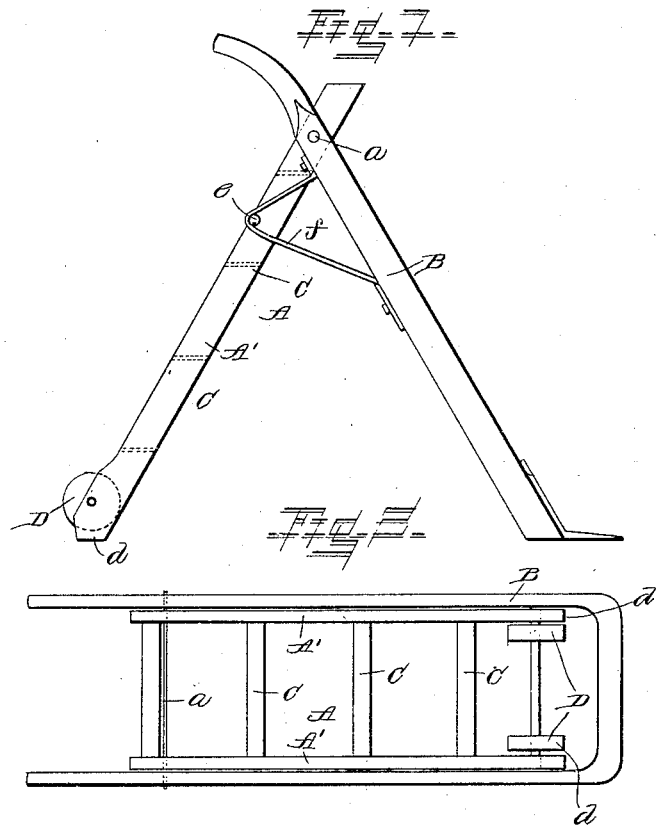
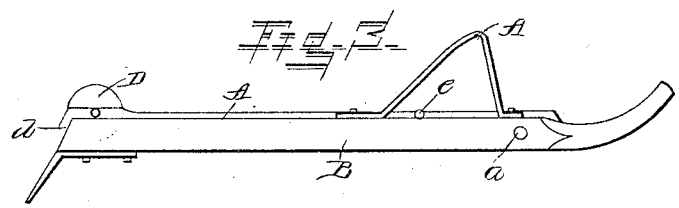
WITNESSES:
INVENTOR:
James Hill,
By Myers & Co.
ATTORNEYS.

UNITED STATES PATENT OFFICE.

JAMES HILL, OF WILKES-BARRÉ, PENNSYLVANIA.

COMBINED TRUCK AND STEP-LADDER.

SPECIFICATION forming part of Letters Patent No. 345,973, dated July 20, 1886.

Application filed May 1, 1886. Serial No. 200,763. (No model.)

*To all whom it may concern:*

Be it known that I, JAMES HILL, a citizen of the United States of America, residing at Wilkes-Barré, in the county of Luzerne and State of Pennsylvania, have invented certain new and useful Improvements in a Combined Truck and Ladder, of which the following is a specification, reference being had therein to the accompanying drawings.

My improvement consists in a combined truck and step-ladder, and in the peculiar construction, combination, and arrangement of the parts, substantially as hereinafter more fully shown and described.

In the accompanying drawings, Figure 1 is a side elevation of my combined truck and step-ladder, showing the device in position when employed as a step-ladder. Fig. 2 is a front view showing the parts folded together; and Fig. 3 is a side elevation of the device in a horizontal position, but inverted.

In the construction of my combined truck and step-ladder, my object is to so arrange the handles and frame on the outside of the steps as to afford more room and greater facility for handling the truck, to adapt the truck footrest to hold the ladder, as well as to support the truck, and to so arrange the wheels of the truck in connection with the ladder that they may be disposed above the floor when the step-ladder is used, in order to permit the step-ladder to firmly rest upon a horizontal plane.

In the embodiment of my invention I hinge together, by means of nutted bar $a$, the step-ladder A and the truck-frame B, the nutted bar $a$ being disposed in corresponding orifices provided in the frame of the step-ladder and the truck frame, and the step-ladder being adapted as to width to fold the step-ladder inside the truck-frame, as shown in Fig. 2.

The step-ladder A, having steps C, secured by any ordinary means between its longitudinal frame-bars A', is provided with wheels D, arranged between said bars upon their axle, at such distance above the ends thereof as to prevent contact of said wheels with the floor when the device is used as a step-ladder, and to admit the ends of the longitudinal bars of the step-ladder, which are beveled at $d$, to conform to the surface-plane of the floor and rest thereon when in an upright position. Step-ladder A has also rigidly secured on one side of its longitudinal frame-bars a pin, $e$, which, when the device is employed as a step-ladder, registers with the foot-rest $f$, which is an angular metallic bar rigidly secured to the step-ladder.

Truck-frame B, consisting of parallel frame-bars secured, as usual, by cross-bars, and a lifting-plate in front, has also its handle arranged on the outside and projecting beyond the steps, as shown, in order that the truck may be handled with greater facility.

Having this fully described my invention, what I claim is—

1. In a combined truck and step-ladder, the angular foot-rest for supporting one end of the truck, in connection with a pin secured on the step-ladder frame for holding the truck in an approximately-upright position, substantially as shown and described.

2. The herein-described combined truck and ladder, comprising the ladder having its sides provided with beveled ends and with pins, the wheels secured therein, the truck, between the side bars of which said ladder is pivoted, and the foot-rests secured to said truck and registering with said pins, the handles of said truck projecting out beyond the step-ladder frame, substantially as shown and described.

3. The combination of the truck-frame having a foot-rest, and the step-ladder having a pin to register with said foot-rest, and wheels disposed substantially as shown, and for the purpose described.

4. The combination, with a step-ladder having a pin on each side thereof and the side bars beveled on their lower ends, of the truck having the foot-rests and the nutted bar pivoting said ladder and truck, substantially as shown and described.

In testimony whereof I affix my signature in presence of two witnesses.

JAMES HILL.

Witnesses:
STANLEY W. WALKER,
CHAS. S. MILES.